June 10, 1969  H. L. ECKDAHL  3,448,860
CAPPING SEPARATOR
Filed March 5, 1968  Sheet 1 of 2
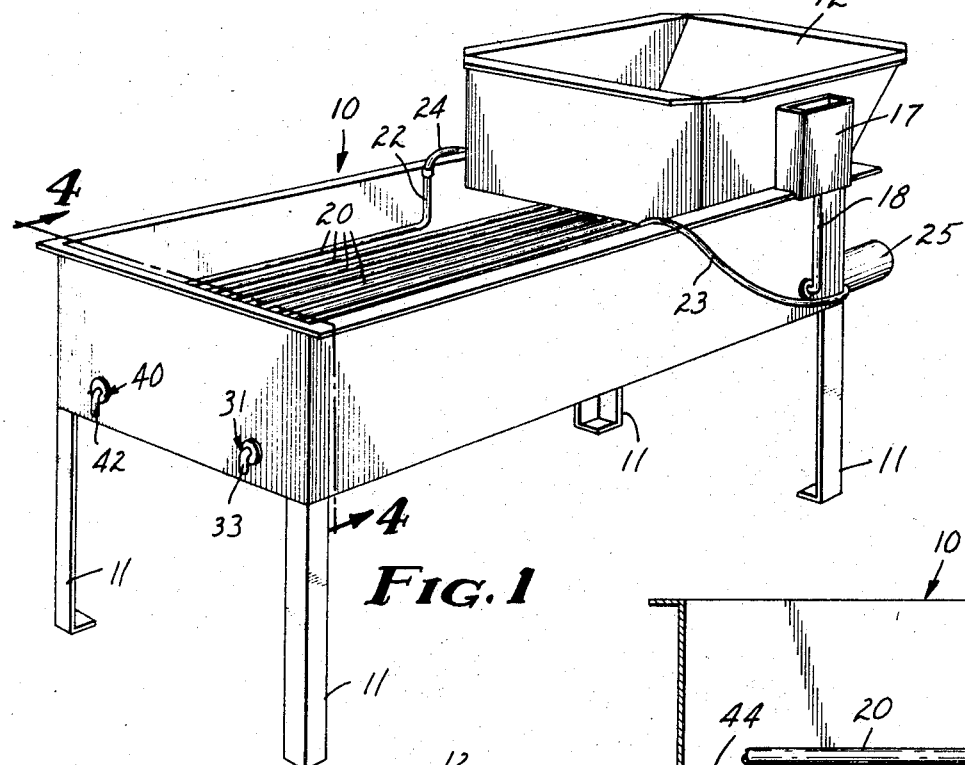
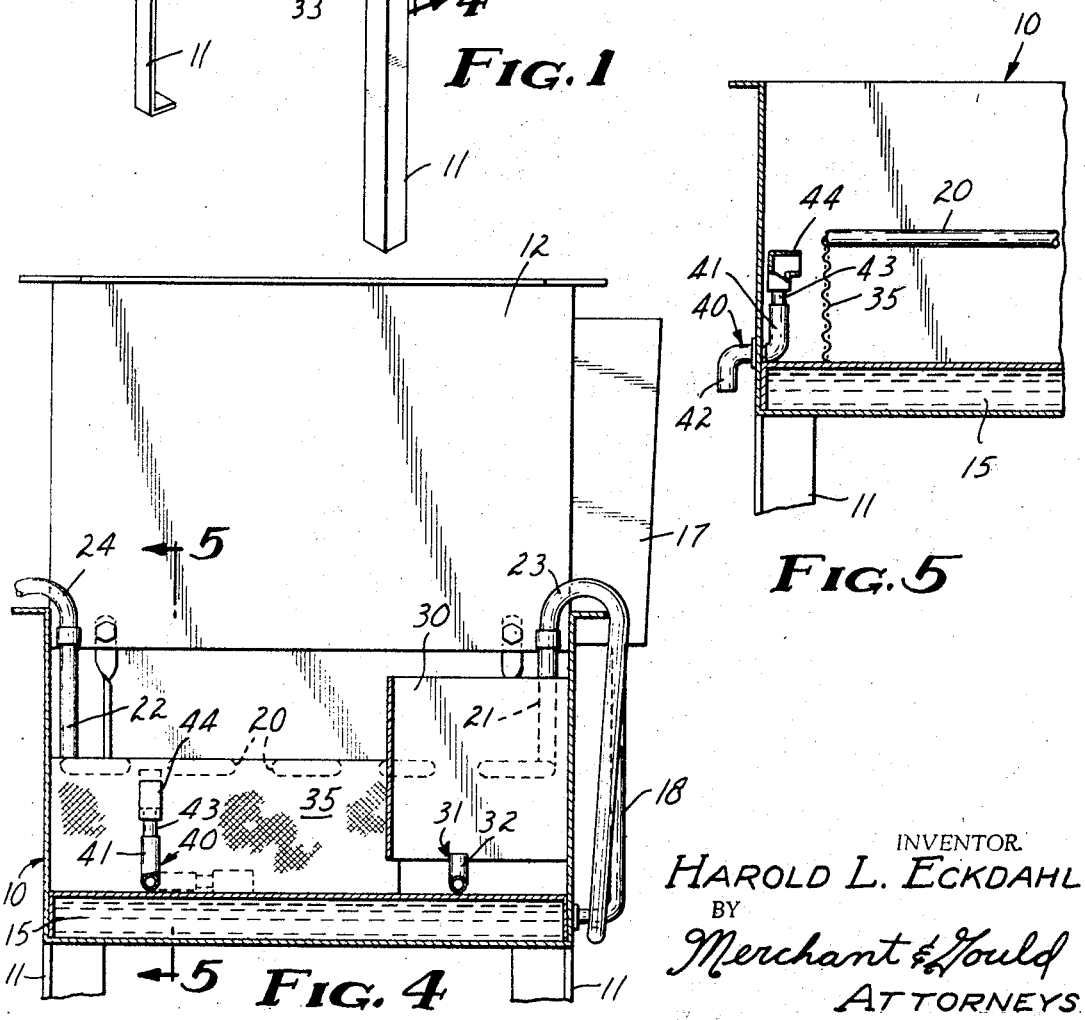
INVENTOR.
HAROLD L. ECKDAHL
BY
Merchant & Gould
ATTORNEYS

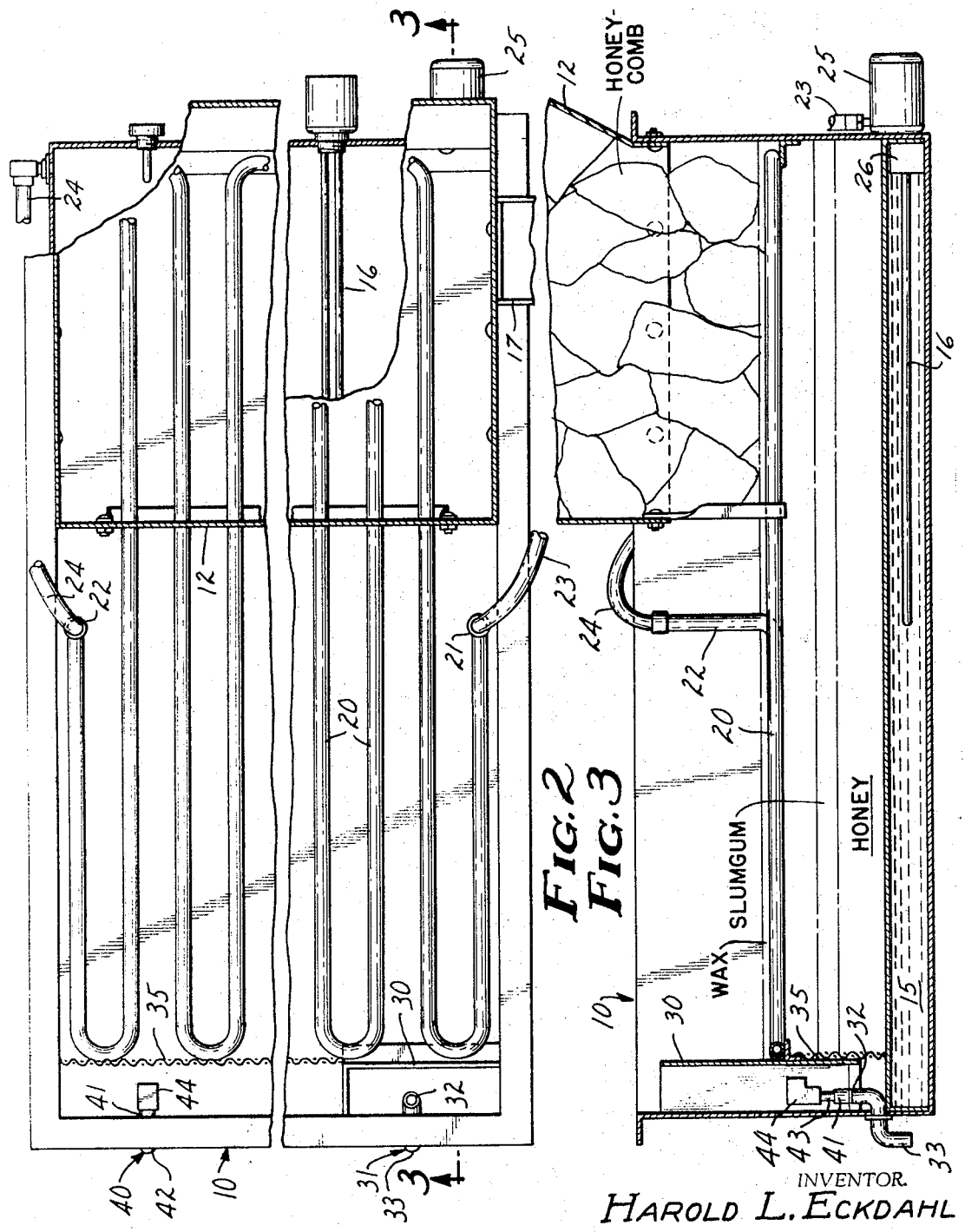

United States Patent Office 3,448,860
Patented June 10, 1969

3,448,860
CAPPING SEPARATOR
Harold L. Eckdahl, 2817 N. 2nd St.,
Minneapolis, Minn. 55411
Filed Mar. 5, 1968, Ser. No. 710,612
Int. Cl. B01d 35/18; C02b 1/02
U.S. Cl. 210—182                4 Claims

ABSTRACT OF THE DISCLOSURE

A rectangular tank having horizontally spaced apart heating coils spaced from the bottom thereof and attached by conduits to a hot water compartment underlying the bottom of the tank, which coils and hot water compartment cooperate to maintain the tank at a predetermined temperature so that honeycombs received therein melt to form a layer of honey on the bottom of the tank with the melted wax forming a layer in overlying relationship thereto and any slumgum forming a layer therebetween. The tank includes a honey outlet having a vertically adjustable inlet positioned within the tank and partially surrounded by a baffle forming a chamber having an opening communication with the honey layer. The tank further includes a beeswax outlet having a vertically adjustable inlet within the tank partially surrounded by screen to substantially prevent slumgum from entering the inlet.

Background of the invention

Field of the invention.—Honeycombs obtained from bees are made up of honey surrounded by cappings, or beeswax, and in addition contain some slumgum, which is a residue consisting chiefly of propolis (the brownish, waxy substance collected and used by bees to cement or calk their hives), cocoons, bits of wax and honey that remain after removal of the readily extractable honey and wax from honeycombs. It is the chief aim of the honey producing industry to remove and place the honey in containers without mixing wax and/or slumgum therein. In some instances it is a further aim of the honey industry to extract the beeswax in a relatively pure state.

Description of the prior art.—In some processes for extracting honey from honeycombs the wax cells are not disturbed and the end caps are simply removed by cutting or the like whereupon the honey is removed from the cells by centrifugal force or the like. In other processes, especially where the beeswax is retained for commercial use, the entire capping is melted and the honey, slumgum and wax are separated by some convenient means. In general, because of the configuration or the type of heat utilized, there is discoloration of the honey or, if the heating is slow enough to prevent discoloration of the honey the entire procedure is much too slow. Further, in many of the prior art devices it is extremely difficult to separate the honey from the melted wax and the slumgum and the entire machines are messy and difficult to clean.

Summary of the invention

The present invention pertains to a capping separator including a receptacle having horizontally spaced apart heating elements mounted therein in spaced relationship from the bottom and heating means mounted in underlying relationship with the bottom for maintaining the lower portion of said receptacle at a predetermined temperature to melt honeycombs received therein and form a layer of honey adjacent the bottom of said receptacle with a layer of melted beeswax in overlying relationship thereto, first adjustable outlet means in said receptacle for removing honey from the honey layer and second adjustable outlet means in said receptacle for removing beeswax from the beeswax layer.

Brief description of the drawings

FIGURE 1 is a view in perspective of the capping separator;

FIGURE 2 is an enlarged view in top plan of the capping separator illustrated in FIGURE 1, some parts thereof removed and some parts broken away and shown in section;

FIGURE 3 is a sectional view as seen from the line 3—3 in FIGURE 2;

FIGURE 4 is an enlarged sectional view as seen from the line 4—4 in FIGURE 1; and FIGURE 5 is a sectional view as seen from the line 5—5 in FIGURE 4.

Description of the preferred embodiment

In the figures the numeral 10 designates a generally box-like receptacle having four legs 11 attached to the corners thereof to support the receptacle 10 at a desired height. The receptacle 10 is open at the top thereof and has attached thereto adjacent one end a hopper 12. The hopper 12 is adapted to receive honeycombs and to feed them at a desired speed into the receptacle 10. It should be understood that the receptacle 10 could be formed in any desired configuration and the use of the hopper 12 or a similar device for feeding the honeycombs into the receptacle 10 is optional.

Heating means are utilized to maintain the lower portion of the receptacle 10 at a predetermined temperature. In this embodiment the heating means includes a hot water tank 15 formed integrally with the receptacle 10 and underlying the bottom thereof. The hot water tank 10 includes an electrical heating element 16 positioned therein which is thermostatically controlled to maintain water in the tank 15 at a predetermined temperature. The hot water in the tank 15 maintains honey and wax within the receptacle 10 at a predetermined temperature, which is in the liquid state. A small reservoir 17 mounted on the side of the hopper 12 (see FIG. 1) is connected to the tank 15 by a conduit 18 and maintains the water in the tank 15 at the desired level. It should be understood that the heating means might be provided and/or formed in a variety of ways well known to those skilled in the art and all such embodiments which perform the functions of the present invention come within the scope thereof.

A plurality of horizontally spaced apart heating elements, which in this embodiment are hot water coils 20, are positioned within the receptacle 10 in spaced relationship from the bottom thereof and extend across the width of the receptacle 10 and from one end to adjacent the other end thereof. The hot water coils 20 extend below the hopper 12 so that honeycombs passing from the hopper 12 into the receptacle 10 must pass between the hot water coils 20. The hot water coils 20 are formed from a continuous length of conduit having two ends 21 and 22 connected in communication with the hot water tank 15 by means of conduits 23 and 24, respectively. The hot water coils 20 are mounted so that they may be removed or moved vertically upwardly and the entire receptacle 10 can be easily cleaned. A water pump 25 is positioned in communication with the tank 15 through inlet means 26 and through the hot water coils 20. Thus, all of the water in the tank 15 and the coils 20 is at approximately the same temperature. The coils 20 are spaced from the bottom of the receptacle 10 so that they are positioned approximately in the layer of melted wax (as illustrated in FIG. 3) when the apparatus is being operated with preferred levels of materials therein. Thus, the honeycombs first come into contact with the coils 20, which coils 20 have a tendency to break up the honeycombs and allow the honey to flow therefrom, whereupon the honey and cappings contact the hot water tank 15 causing the honey to heat quickly to the desired temperature and also producing further separation. As the honey separates from the cappings and heats to the desired temperature the wax quickly floats to the top of the material where it again contacts the coils 20. This combination of top and bottom heating quickly melts the wax and forms a layer of liquid wax in overlying relationship to the honey.

At the end of the receptacle 10 opposite the hopper 12 the ends of the coils 20 are spaced horizontally from the end of the receptacle 10 so as to form an open space therebetween. A baffle 30, which is a flat rectangularly spaced piece of material bent so as to provide it with an L-shaped cross section, is fixedly attached to the inner side and end of the receptacle 10 to form a generally rectangular shaped chamber between the baffle 30 and the inner surfaces of the receptacle 10. The lower edge of the baffle 30 is spaced a short distance from the bottom of the receptacle 10, as seen in FIGS. 3 and 4, to allow honey to flow thereunder and fill the chamber while preventing, or at least hindering, the flow of slumgum and wax therein. A first adjustable outlet means 31, which consists of a serpentine shaped length of conduit extending through the end wall of the receptacle 10 with a generally L-shaped inlet end 32 extending horizontally inwardly from the end wall and turning vertically upwardly and a generally L-shaped outlet end 33 extending generally horizontally outwardly from the end wall of the receptacle 10 and bent vertically downwardly, is rotatably mounted in the end wall of the receptacle 10 with the inlet end 32 positioned in the chamber formed by the baffle 30. The opening at the inlet end 32 of the first outlet means 31 is vertically adjustable by rotating the outlet means 31 about the horizontal portion of its longitudinal axis extending through the end wall of the receptacle 10. Under normal operating conditions the outlet means 31 is operated with the inlet end 32 in its uppermost vertical position to maintain the amount of honey in the receptacle 10 at its preferred level. At the termination of operations the outlet means 31 may be rotated to lower the inlet end 32 and remove substantially all of the honey from the receptacle 10.

A screen 35 is permanently affixed across the inner end of the receptacle 10 from the baffle 30 to the opposite side of the receptacle 10 and from the bottom of the receptacle 10 to the coils 20. The screen 35 forms an area at the end of the receptacle 10 which is substantially free of slumgum. A second adjustable outlet means 40 is formed similar to the first outlet means 31 with an inlet end 41 positioned inside the receptacle 10 and an outlet end 42 extending downwardly outside the receptacle 10. In addition, the inlet end 41 has a tubular extension 43 attached thereto with a vertically adjustable inlet adaptor 44 slideably engaged thereon for vertical movement therealong. The level at which wax flows into the inlet adaptor 44 and out of the receptacle 10 through the second outlet means 40 can be varied by adjusting the vertical position of the inlet adaptor 44 on the tubular extension 43. The second outlet means 40 is positioned in the end wall of the receptacle 10 so that the inlet end 41, the tubular extension 43 and the inlet adaptor 44 extend vertically upwardly between the end wall of the receptacle 10 and the screen 35. Thus, by adjusting the vertical position of the inlet adaptor 44 pure wax can be removed from the wax layer in the receptacle 10 with substantially no slumgum intermixed therewith. It should be understood that the baffle 30, a screen 35, first outlet means 31 and second outlet means 40 might be modified by those skilled in the art and all such modifications and embodiments which perform the functions of the present invention come within the scope thereof. It should also be understood that various means of controlling the flow of honey from the first outlet means 31 and wax from the second outlet means 40 can be utilized in conjunction with the respective outlet ends 33 and 42, and no specific flow control means has been illustrated in this disclosure since they do not form a part of this invention and will vary according to the preference of the different operators.

Thus, a capping separator is disclosed which provides controlled heat adjacent the bottom and the top of the receptacle 10 for quickly and efficiently separating honey, slumgum and wax into layers without causing undesirable discoloration of the honey. The present invention further includes apparatus for quickly and efficiently removing relatively pure honey and relatively pure wax from the separator with relatively no intermixing of the two or intermingling of slumgum therein. In addition the present invention is constructed for easy removal of the slumgum periodically during the operation thereof or after completion of the operation. The slumgum may be removed during operation by screens or the like (not shown) or by normal cleaning operation after the removal of the honey and beeswax.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What is claimed is:
1. Capping separator apparatus comprising:
 (a) an elongated receptacle having capping inlet means adjacent one end thereof;
 (b) horizontally spaced apart hot water coils mounted within said receptacle in spaced relationship from the bottom thereof and extending substantially the length of said receptacle;
 (c) a hot water tank mounted below the hot water coils and in spaced apart, substantially parallel relationship thereto and in juxtaposition with the bottom of said receptacle and extending substantially the length of said receptacle for maintaining the lower portion of said receptacle at a predetermined temperature and for maintaining honey and beeswax contained within said receptacle in a liquid state with the honey forming a layer adjacent the bottom of said receptacle and the wax forming a layer in overlying relationship to the honey layer;
 (d) a hot water pump and conduit means connecting said hot water coils and said hot water tank for circulation of hot water through said coils;
 (e) a heating element operatively mounted on said apparatus in heat exchange relationship with said hot water tank and coils for heating to a desired temperature water contained within said hot water coils and said hot water tank when properly energized;
 (f) means to energize said heating element;
 (g) first outlet means mounted in said receptacle adjacent the bottom thereof for removing honey from the honey layer; and
 (h) second outlet means mounted in said receptacle and adjustable vertically for removing beeswax from the beeswax layer.

2. Capping separator apparatus as set forth in claim 1 having in addition baffle means mounted within the receptacle to form a chamber therein surrounding the first outlet means, said chamber having an opening therein generally below the operative upper level of the honey layer.

3. Capping separator apparatus as set forth in claim 1 having in addition screen means at least partially surrounding the second outlet means for substantially preventing the withdrawal of slumgum and the like with the beeswax.

4. Capping separator apparatus as set forth in claim 1 wherein the second outlet means includes a beeswax inlet within the receptacle positioned substantially higher than a honey inlet within the receptacle included in the first outlet means for allowing the accumulation of a substantial layer of beeswax above the honey layer.

References Cited

UNITED STATES PATENTS

| Re. 13,674 | 1/1914 | Beuhne | 210—187 |
|---|---|---|---|
| 1,263,944 | 4/1918 | Severin | 210—184 X |
| 2,520,304 | 8/1950 | Brand | 210—187 |
| 3,272,339 | 9/1966 | Olson | 210—187 X |
| 3,343,678 | 9/1967 | Olson | 210—184 X |

FOREIGN PATENTS 255,669  5/1963  Australia.

REUBEN FRIEDMAN, *Primary Examiner.*

C. N. DITLOW, *Assistant Examiner.*

U.S. Cl. X.R.

210—184, 187